C. R. KECK.
ATTACHMENT FOR PLOW GUARDS.
APPLICATION FILED MAY 25, 1911.
1,106,389.
Patented Aug. 11, 1914.
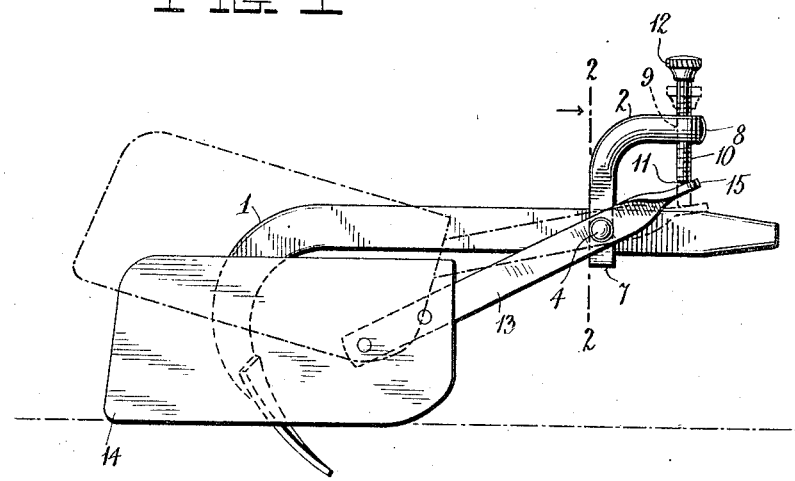
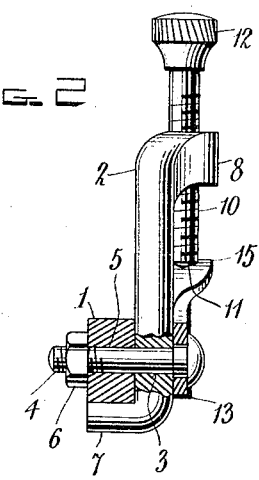
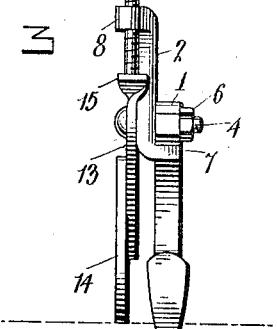

UNITED STATES PATENT OFFICE.

CHARLES R. KECK, OF NELSONVILLE, MISSOURI.

ATTACHMENT FOR PLOW-GUARDS.

1,106,389.  Specification of Letters Patent.  Patented Aug. 11, 1914.

Application filed May 25, 1911. Serial No. 629,436.

*To all whom it may concern:*

Be it known that I, CHARLES R. KECK, a citizen of the United States, residing at Nelsonville, in the county of Marion, State of Missouri, have invented certain new and useful Improvements in Attachments for Plow-Guards; and I do hereby declare the following to be a full, clear, and exact description of the invention, such as will enable others skilled in the art to which it appertains to make and use the same.

The present invention relates to an adjustable plow guard attachment for plow beams and the like, and has for its object to construct an attachment, which is simple in construction and efficient in operation.

With these and other objects in view, the invention consists in the construction and novel combination of parts hereinafter fully described, illustrated in the accompanying drawings, and pointed out in the claim hereto appended; it being understood that various changes in the form, proportion, size and minor details of construction, within the scope of the claim, may be resorted to without departing from the spirit or sacrificing any of the advantages of the invention.

In the drawing:—Figure 1 is a side elevation of a plow, showing the manner in which the attachment is connected thereto. Fig. 2 is a sectional view on line 2—2 of Fig. 1. Fig. 3 is an end view of a plow, the attachment being in its proper position thereon.

Referring to the drawing, the numeral 1 designates a plow beam of the usual construction. Adapted to be secured to the beam 1 is a stem 2, said stem having its lower end provided with a perforation 3 and through which a bolt 4 is passed. The beam 1 is also provided with a perforation 5 to permit the passage of the bolt 4 for the reception of a clamping nut 6.

The lower portion 7 of the stem is bent at right-angles, and is adapted to have its upper face resting against the under side of the beam 1, thereby preventing rocking of the stem. The upper portion 8 of the stem being bent at right-angles to the lower portion 7 and has formed near its outer end a threaded perforation 9 the axis of which is parallel with the stem 2 and through which is threaded a stop screw 10 the lower end of which is beveled, as at 11 in the drawings, and is provided with a head 12 whereby the same may be rotated for adjustment.

Pivotally connected to the bolt 4 is a bar 13, to one end of which is secured the guard 14. The bar 13 is formed from stout sheet metal and has one of its ends partially twisted to produce a plate 15 and upon which the beveled end of the stop screw 10 engages.

The guard 14 may be adjusted and held in any of its adjusted positions upon operation of the stop screw 10 which when rotated in one direction causes the guard to be raised, and upon rotation in the opposite direction the guard is lowered by gravity.

What is claimed, is:—

The combination with a plow beam having a flat underside, of a rod disposed against one side of the beam and having its lower end directed laterally across the beam and provided with a flat upper side engaging the flat underside of the plow beam, a lateral extension on the upper end of the rod disposed substantially parallel to the beam and longitudinally thereof, the free end of the last named lateral extension being directed away from the beam and provided with an opening, a screw movable through said opening, a bar engaging the outer side of the first named bar, a fender attached to the second named bar, a bolt passing through both of said bars and through the plow beam and rigidly securing the first named bar to the plow beam and pivotally supporting the second named bar, and the end of the second named bar remote from the fender being twisted to form a flat plate for contact with the screw whereby the vertical adjustment of said screw will effect a vertical adjustment of the fender.

In testimony whereof, I affix my signature, in presence of two witnesses.

CHARLES R. KECK.

Witnesses:
  E. F. BOHON,
  W. E. VENER.

Copies of this patent may be obtained for five cents each, by addressing the "Commissioner of Patents. Washington, D. C."